US006048096A

United States Patent [19]

[11] Patent Number: 6,048,096

[45] Date of Patent: Apr. 11, 2000

Verbeeck et al.

[54] SYSTEM AND METHOD FOR RADIOLOGICAL IMAGE FORMATION

[75] Inventors: Ann Verbeeck, Begijnendijk; Freddy Henderickx, Olen; Johan Loccufier, Zwifnaarde; Peter Verrept, Avelgem, all of Belgium

[73] Assignee: Agfa-Gevaert, N.V., Mortsel, Belgium

[21] Appl. No.: 09/028,451

[22] Filed: Feb. 24, 1998

Related U.S. Application Data

[60] Provisional application No. 60/044,548, Apr. 28, 1997.

[30] Foreign Application Priority Data

Mar. 1, 1997 [EP] European Pat. Off. .............. 97200590

[51] Int. Cl.$^{7}$ .............. G03B 42/04

[52] U.S. Cl. .............. 378/182; 430/966

[58] Field of Search .............. 378/182, 185, 378/183; 430/139, 966

[56] References Cited

U.S. PATENT DOCUMENTS

| | | | |
|---|---|---|---|
| 3,717,466 | 2/1973 | Florens et al. | 96/107 |
| 4,770,978 | 9/1988 | Matsuzaka et al. | 430/363 |
| 5,285,490 | 2/1994 | Bunch et al. | 378/156 |
| 5,420,001 | 5/1995 | Ito et al. | 430/567 |
| 5,461,660 | 10/1995 | Dooms et al. | 378/185 |
| 5,591,570 | 1/1997 | Takiguchi et al. | 430/567 |
| 5,811,229 | 9/1998 | Van Den Zegel | 430/517 |

*Primary Examiner*—David V. Bruce
*Assistant Examiner*—Michael J. Schwartz
*Attorney, Agent, or Firm*—Breiner & Breiner

[57] ABSTRACT

An image-forming system for radiological imaging is described consisting of an intensifying screen comprising on a support at least one layer of a green-light emitting phosphor and, in operative association therewith, a prehardened light-sensitive photographic silver halide film material, comprising a support and on both sides thereof one or more hydrophilic colloid layers having monodisperse cubic silver chloroiodide grains with a mean crystal diameter of from 0.40 $\mu$m up to 0.65 $\mu$m or {111} tabular silver chloroiodide grains having an aspect ratio of from 5 to 20 and a tabularity from 20 to 200; wherein said grains have been spectrally sensitized in the green wavelength range and have been coated in a total amount of silver per sq.m. of from 6 g up to 8 g, expressed as an equivalent amount of silver nitrate per sq.m.; wherein in the image-forming system silver chloroiodide grains have been chemically sensitized with one or more selenide compound(s) generating silver selenide.

20 Claims, No Drawings

SYSTEM AND METHOD FOR RADIOLOGICAL IMAGE FORMATION

The application claims the benefit of U.S. Provisional Application No. 60/044,548 filed Apr. 28, 1997.

DESCRIPTION

1. Field of the Invention

The present invention relates to a system for radiological image formation by means of a suitable film material in operative association with an intensifying screen and to a method for image formation.

2. Background of the Invention

During the last decade there is an ever lasting demand in medical diagnosis to get an image in quite a short time after the patient has been exposed to X-rays with preferably minimum radiation doses. An important step having a determining influence on the total time between exposure of the patient and examination by the radiologist is the processing time. Materials coated from emulsions having crystals rich in silver chloride are advantageous with respect to rapid processing (shorter developing times as well as fixation times for crystals rich in silver chloride) if compared with those coated from emulsions rich in silver bromide or silver bromoiodide as has been demonstrated in U.S. Pat. Nos. 5,397,687 and 5,464,730; in EP-A's 0 678 772 and 0 794 456. These references are illustrative for the feasibility in diverse applications of using tabular grain emulsions rich in silver chloride as well as small cubic grains rich in silver chloride having a crystal diameter of less than 0.65 $\mu$m.

When images are generated from silver halide photographic film materials exposed to appropriate visible light for which the film materials are made sensitive, wherein said visible light is generated by conversion of X-ray irradiated intensifying screens held in intimate contact with said screens, subsequently followed by processing of the said film materials, then it is a stringent requirement to obtain a high covering power and a good image tone (color hue) of the developed silver, preferably a purely black image, in the already mentioned rapid processing conditions. The said image tone is closely related with the crystal size of cubic silver halide emulsions at one side and with thickness and aspect ratio of tabular silver halide grains at the other side as becomes clear from EP-A 0 555 897 and 0 569 075. So it is well-known that thicker tabular grains having lower aspect ratios are in favour of a suitable black image tone, whereas for cubic grains a lower sphere equivalent diameter gives, to a certain extent, gives a more "pure black" image tone.

It is clear that in wet processing conditions chemical waste after processing of the said materials should preferably be reduced to minimum amounts. Therefore it is recommended to reduce replenishing amounts of developer and fixer. Especially when silver halide photographic materials are strongly hardened cross-over of liquid processing solutions and of rinsing water is reduced to a minimum and the drying time of the processed material can considerably be reduced.

Otherwise there is a demand for environmental friendly or ecologically justified systems for image formation in order to minimize the load of the environment at the level of the customer: preferred low coating amounts of silver halide in the silver halide material therefore may lay burden on the preferred high covering power of the developed crystals, the more if use is made of cubic crystals if compared with tabular grains. For the said tabular grains it has been disclosed in U.S. Pat. No. 4,414,340 that high hardening levels of silver halide materials coated from such grains are maintaining covering power of developed grains at the preferred level. In EP-A 0 709 730 and in EP-Application No. 96203728, filed Dec. 30, 1996, it has further been shown that in a developer having an adapted chemical composition, covering power is advantageously increased.

Strongly hardened silver halide photographic materials moreover provide the advantage to use concentrated developing and fixing solutions free from hardening agents as has been set forth e.g. in U.S. Pat. No. 5,296,342, which again is in favour of ecology.

From the side of the manufacturer of silver halide photographic film materials it is thus of utmost importance to provide strongly hardened films coated from low amounts of silver halide in favour of consumption of low amounts of chemicals, wherein said films can be processed in a processing cycle wherein hardener free processing solutions are used, without loosing speed or covering power in short (rapid) processing times. Efficient cross-linking of the gelatin chains of the photographic material indeed reduces the amount of water absorption in the processing cycle of the said material comprising cubic emulsion crystals having a grain diameter of less than 0.65 $\mu$m or flat tabular emulsion grains having an aspect ratio of less than 12.

An ever lasting demand however will remain to further improve the sensitivity (speed) of the said crystals from the side of crystal habit and/or composition on one hand and chemical and/or spectral sensitization at the other hand, especially under the severe limiting circumstances described above. With respect to the chemical ripening process the use of selenium sensitizers has been promoted, especially during the last decade. Patent literature related with the chemical ripening of emulsion grains rich in silver chloride can be found e.g. in EP-A's 0 443 453, 0 454 278; 0 458 278; 0 513 748; 0 590 593; 0 661 589 and 0 718 674 and in U.S. Pat. Nos. 4,810,626; 5,306,613 and 5,348,850, wherein said selenium sensitizers are normally used together with other sensitizers as at least gold and optionally sulphur.

OBJECTS OF THE INVENTION

Therefore it is an object of the present invention to provide a system for radiological image formation having a so-called "400"-speed (high speed), offered by means of a suitable double-side coated or duplitized silver halide photographic film material in operative association with an intensifying screen, wherein after exposure to X-ray irradiation an image is formed in hardener free processing, wherein use is made of minimum replenishing amounts of chemicals, in favour of ecology, within a dry-to-dry cycle time of from 30 to less than 50 seconds, offering besides said "400" speed a suitable black image tone.

Particularly it is an object of the present invention to reach the required high speed of the film-screen system with emulsion crystals rich in silver chloride.

SUMMARY OF THE INVENTION

According to the present invention, an image-forming system for radiological imaging is provided, said system consisting of an intensifying screen comprising on a support at least one layer of a green-light emitting phosphor and in operative association therewith a prehardened light-sensitive photographic silver halide film material, comprising a support and on both sides thereof one or more hydrophilic colloid layers, said layers being hardened to such an extent that their swelling degree is reduced to less than 200% after immersing said material for 2 minutes in demineralized water of 35° C.; comprising in at least one of said hydrophilic layers chemically ripened, monodisperse cubic silver chloroiodide grains having a mean crystal diameter of from 0.40 μm up to 0.65 μm or chemically ripened {111} tabular silver chloroiodide grains having an aspect ratio of from 5 to 20 and a tabularity from 20 to 200; wherein said grains have been spectrally sensitized for the wavelength range between 520 and 580 nm, have a maximum absorption between 540 and 550 μm and have been coated in a total amount of silver per sq.m. of from 6 g up to 8 g, wherein said amount is expressed as an equivalent amount of silver nitrate per sq.m.; characterized in that in said image-forming system said silver chloroiodide grains have been chemically sensitized with one or more selenide compound(s) generating silver selenide in an emulsion comprising said grains at a temperature of from 45° C. up to 70° C. at an electrical potential difference between a silver electrode and a saturated silver/silver chloride reference electrode of from 100 up to 200 mV.

DETAILED DESCRIPTION

Quite unexpectedly it has become clear from our experiments that even when a light-sensitive emulsion layer from the material of the image-forming system according to the present invention comprises relatively small cubic silver chloroiodide crystals with an average grain size of from 0.40 μm up to 0.65 μm and a monodisperse grain distribution or comprises {111} tabular silver chloroiodide grains with an aspect ratio of from 5 to 20 and a tabularity (defined as a ratio between aspect ratio and crystal thickness) of from 20 to 200; a sufficient speed is attained without deterioration of image tone, in that no shift to brown colored silver after development is observed for both types of crystal habit defined hereinbefore.

Therefore it is required to chemically sensitize said silver chloroiodide grains with one or more unstable selenium compound(s).

Specific well-known examples of unstable selenium sensitizers are isoselenocyanates (e.g., aliphatic isoselencyanates such as allylisoselenosyanate), selenoureas, selenoketones, selenoamides, selenocarboxylic acids (e.g. 2-selenopropionic acid, and 2-selenobutyric acid) selenoesters, diacylselenides (e.g. bis(3-chloro-2,6-dimethoxybenzoyl)selenide), selenophosphates, phosphineselenides as triphenylphosphorselenide and colloidal elemental selenium.

In the context of the present invention however unstable selenium compounds should generate silver selenide in an emulsion comprising said grains at a temperature of from 45° C. up to 70° C. and at an electrical potential difference between a silver electrode and a saturated silver/silver chloride reference electrode of from 100 up to 200 mV only. It could e.g. be proved (see also Examples) that triphenylphosphorselenide was not a suitable chemical sensitizer for silver chloroiodide emulsion crystals coated in materials used in the image-forming system of the present invention.

Only in those well-defined circumstances given hereinbefore it is possible to reach the required speed at low fog levels and with the desired sensitometric stability in the image-forming system of the present invention.

To silver chloroiodide emulsion grains used in the image-forming system according to the present invention, wherein after precipitation and redispersion said grains are also called "primitive" or "unripened" as long as no chemical sensitizer(s) is(are) added, addition of selenium compounds generating silver selenide in the prescribed circumstances is thus required. Such selenium compounds are preferably compounds selected from the group consisting of substituted selenoureum, substituted triphenylphosphine selenide and substituted and unsubstituted triphenylorthophosphate selenide.

Specific examples of those groups of compounds are given hereinafter (see the formulae I to VII), without however being limited thereto:

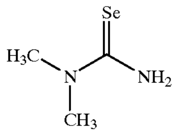

-dimethylselenoureum (formula I)

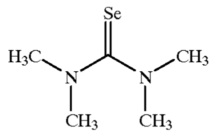

-tetramethylselenoureum (formula II)

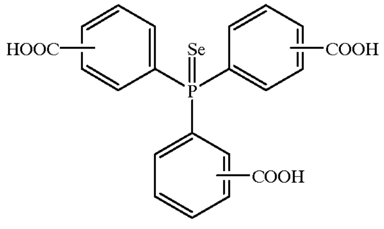

(formula III)
-triphenyl-tricarboxylic acid substituted phosphine selenide

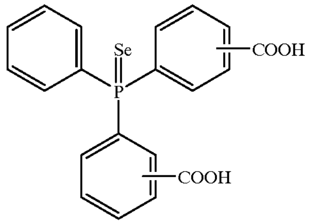

(formula IV)
-triphenyl-dicarboxylic acid substituted phosphine selenide

-continued

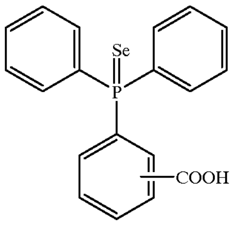

(formula V)

-triphenyl-(mono)carboxylic acid substituted phosphine selenide

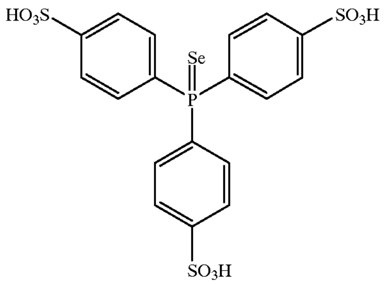

(formula VI)

-triphenyl-sulphonic acid substituted phosphine selenide

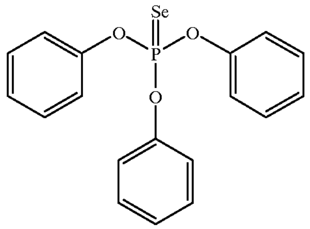

(formula VII)

-triphenylorthophosphate selenide

One or more of these chemical sensitizers generating silver selenide only in the well described circumstances of temperature and potential is thus preferred in the chemical sensitization method applied to the essentially cubic or {111} tabular silver chloroiodide crystals coated in one or more emulsions in light-sensitive hydrophilic layers of radiographic materials of screen-film image-forming systems according to the present invention.

In a preferred embodiment said monodisperse cubic grains and/or {111} tabular silver chloroiodide grains should further be chemically ripened with one or more sulphur and/or gold compounds.

Patent literature with respect to the use of selenium sensitizers for chemical ripening of silver chloroiodide grains can be found in EP-A's 0 443 453, 0 454 278; 0 458 278; 0 513 748; 0 590 593; 0 661 589 and 0 718 674 and in U.S. Pat. Nos. 4,810,626; 5,306,613 and 5,348,850, wherein said selenium sensitizers are normally used together with other sensitizers as at least gold and optionally sulphur.

Especially useful labile compounds providing sulphur are the more preferred compounds selected from the group consisting of tetramethyl-thiodithioacetic acid diamide (which is preferably used in the context of the present invention), dimethylamino-dithiomercaptane, thiosulphate and thiosulphonate compounds. Other useful compounds are those as described e.g. in "Chimie et Physique Photographique" by P. Glafkides, in "Photo-graphic Emulsion Chemistry" by G. F. Duffin, in "Making and Coating Photographic Emulsion" by V. L. Zelikman et al, and in "Die Grund-lagen der Photographischen Prozesse mit Silberhalogeniden" edited by H. Frieser and published by Akademische Verlagsgesellschaft (1968).

As described in said literature chemical sensitization can be carried out by effecting the ripening in the presence of small amounts of compounds containing sulphur as e.g. thiosulphate, thiocyanate, thioureas; sulphites, mercapto compounds, rhodamines etc. ., wherein combinations of gold-sulphur ripeners together with the required selenium sensitizers are the most preferred. Addition of tellurium compounds as e.g. tellurosulphate, tellurocyanate, tellur-oureas in very small amounts is thereby however not excluded. Further reductors as e.g. tin compounds as described in GB-A 789,823, amines, hydrazine derivatives, formamidine-sulphinic acids, and silane compounds may be used, although care should be taken in order to prevent the emulsion from fog formation in an uncontrollable way.

Normal amounts of selenium compounds are in the range from $1\times10^{-5}$ to $1\times10^{-7}$ moles per mole of silver, whereas normal amounts of gold compounds (as gold chloride or gold thiocyanate) are in the range from $1\times10^{-5}$ to $2.5\times10^{-5}$ moles per mole of silver.

As has already been suggested hereinbefore the use of reducing agents in the chemical ripening of silver halide emulsion crystals rich in chloride is not preferred, but not excluded either as depending upon the circumstances it may be recommended to use small amounts in order to counterbalance the restraining actions from spectral sensitizers, fog-restrainers or stabilizers as e.g. substituted heterocyclic mercapto-compounds described in U.S. Pat. No. 5,242,791. Silver solvents may have a regulating role therein as e.g. those comprising thiocyanate ions.

It is a common method to add chemical sensitizers after redispersion and in the case of tabular grains during and/or after spectral sensitization as has already been suggested hereinbefore. Before starting chemical sensitization the surface of the silver chloroiodide grains may be treated with slightly oxidizing compounds as e.g. toluene thiosulphonic acid and/or corresponding salts thereof in order to reduce small silver specks to grow to fog centers in an uncontrolled manner.

As silver chloroiodide crystals having a regular habit "essentially cubic" as well as "{111} tabular" crystals are well-known. For practical applications emulsions with essentially cubic crystals have a longer history than emulsions having tabular crystals.

In the preparation step of silver chloroiodide crystals the precipitation conditions thereof can be chosen such that said emulsions are emulsions having an essentially cubic crystal habit. The precipitation of such cubic crystals can be principally performed by one double jet step; alternatively it may consist of a sequence of consecutive double jet steps comprising a nucleation step and at least one growth step. The different steps of the precipitation can be alternated by physical ripening steps. In order to get reproducible emulsion grain distributions said different steps proceed under controlled conditions of pH, pAg, temperature, stirring velocity and addition rates, wherein said addition rates may be held constant or may be increased as precipitation proceeds in order to reduce the total time thereof. However care should be taken in order to avoid renucleation. During the precipitation a crystal growth accelerator can be added, in favour of crystal growth, further avoiding renucleation. Preferred examples of growth accelerators are thioether compounds as e.g. methionine, 1,8-dihydroxy-3,6-dithiooctane, etc., or polyoxyalkylenes although care should be taken with respect to fog formation.

Crystals having an essentially cubic habit, dispersed as an emulsion coated in one or more hydrophilic layers of the material used in the image-forming system of the present invention have an average crystal diameter of from 0.40 μm up to 0.65 μm, with a high degree of homogeneity: a variation coefficient on the grain size distribution of less than 0.25 and, more preferred, between 0.10 and 0.20 contributes to the desired sensitometry and image quality. Mixtures of emulsions having grains with homogeneous or monodisperse grain size distributions may be useful.

In the image-forming system according to the present invention {111} tabular silver chloroiodide grains having an aspect ratio of from 5 to 20 and a tabularity from 20 to 200 are successfully used as well as the (essentially) cubic grains described hereinbefore.

Tabular silver halide grains having a {111} crystal habit have been promoted since 1982 as being applicable in photographic materials for practical use and are defined as crystals possessing two parallel faces with a ratio between the diameter of a circle having the same area as these faces (the so-called equivalent circular diameter or E.C.D.), and the thickness, being the distance between the two major faces, equal to at least 2. In the present invention {111} tabular silver chloroiodide grains have aspect ratios of from 5 to 20 and tabularities of from 20 to 200. The tabularity of such tabular crystals is therein defined as the ratio between average aspect ratio and grain thickness or between E.C.D. and thickness square. As nowadays the tendency is present to get materials processed in shorter processing times, it is highly appreciated to combine said advantages with a high sensitivity for applications in high-sensitive materials, an object which has been realised as has e.g. been described in EP-A 0 678 772, which is incorporated herein by reference. Compounds that are useful as crystal habit modifier for tabular crystals rich in silver chloride besides the most frequently used adenine, include substances disclosed in EP-A's 0 481 133 and 0 532 801 and in U.S. Pat. Nos. 5,176,991; 5,176,992; 5,178,997; 5,178,998; 5,183,732; 5,185,239; 5,217,858; 5,221,602; 5,252,452; 5,264,337; 5,272,052; 5,298,385; 5,298,387; 5,298,388; 5,399,478; 5,405,738; 5,411,852 and 5,418,125.

Tabular silver halide grains rich in chloride, bounded by {111} major faces and/or the preparation method thereof and/or materials in which said grains are incorporated have also been described in e.g. U.S. Pat. Nos. 4,399,215; 4,400,463; 4,804,621; 5,061,617; 5,275,930; 5,286,621; 5,292,632; 5,310,644; 5,320,938; 5,356,764; in the published EP-A's 0 503 700, 0 533 189, 0 647 877 and 0 678 772. Iodide ions may be provided by using aqueous solutions of inorganic salts thereof as e.g. potassium iodide, sodium iodide or ammonium iodide. Iodide ions can however also be provided by organic compounds releasing iodide ions as has e.g. been described in EP-A's 0 561 415, 0 563 701, 0 563 708, 0 649 052 and 0 651 284 and in WO 96/13759.

Especially in order to obtain a more homogeneous iodide distribution over the crystal volume in the crystal lattice and over the whole crystal distribution iodide ions provided by organic agents releasing iodide ions are preferred such as mono iodide acetic acid, mono iodide propionic acid, mono iodide ethanol and even hydrogels containing iodide ions, capable to generate iodide ions. Generation of iodide ions is triggered by changing the pH value in the reaction vessel during or, preferably, after addition of the said organic agent releasing iodide ions. Opposite to the addition of potassium iodide as a source of iodide ions the said organic compounds releasing iodide ions are leading to a more homogeneous iodide ion distribution over the different tabular crystals, thus avoiding undefined heterogeneities and irreproducibilities. Another method of triggering generation of iodide ions is performed by addition of sulphite ions to the reaction vessel. Combinations of inorganic and organic agents providing iodide ions may also be useful. The presence of iodide ions stabilizes the (111)-crystal faces.

Although preferred with respect to intrinsic and to spectral sensitivity it is recommended to limit average iodide concentrations to up to 3 mole % and even more preferably to limit them from 0.1 mole % to 1.0 mole %, based on the total silver amount as higher concentrations retard development and lead to unsatisfactory sensitivities. Moreover the velocity of fixation can be disturbed in that case and as a consequence residual coloration may be unavoidable. In EP-A 0 678 772 e.g. an excessive amount of iodide has been provided by conversion at the end of precipitation and thus at the end of the last growth step in order to have a total concentration of iodide of 1.3 mole % in the {111} tabular silver chloroiodide emulsion thus obtained.

Grain size distributions of silver chloroiodide crystals over the light-sensitive emulsion are homogeneous or monodisperse by controlling the precipitation methods used. Metal ions or metal ion complexes also called dopants, commonly added in low amounts to the silver chloroiodide crystals in whatever a stage of the preparation, generally have little influence on crystal distributions in the emulsions but may be added to cause advantageous effects with respect to reciprocity, pressure sensitization, etc. .

Therefore it is very important to carefully controll pAg, temperature, dilution of the reaction vessel, presence of growth restrainers or growth accelerators, addition rate of added aqueous soluble silver salt and halide solutions during different precipitation steps (especially during the nucleation step during which e.g. less than 10% of the total amount of silver salt available is consumed and further during the at least one growth step during which at least 90% of the said silver salt is consumed), way of mixing and mixing or stirring rate in the reaction vessel during the different precipitation steps leads to homogeneous crystal size distributions having variation coefficients (defined as ratio between standard deviation and average diameter) of not more than 0.10 to 0.20 instead of the normally occurring variation coefficients between 0.20 and 0.30. Depending on the precipitation conditions more heterogeneous distributions can be obtained and may even be more advantageous e.g. from the point of view of exposure latitude but in order to obtain the same effect of e.g. an increasing exposure latitude is reached by making mixtures of different homogeneous emulsions having very low variation coefficients e.g. in the range from 0.05 to 0.15. This may lead to even more advantageous sensitometric characteristics (e.g. increased contrast) or image quality (e.g. granularity and/or sharpness) as has been illustrated e.g. in U.S. Pat. No. 4,446,228 and in EP-A 0 555 897.

For practical use thin tabular grains accounting for at least 50% of the total projective surface area of all grains, more preferred for at least 70% and still more preferred for at least 90%, are present.

Boundary values of aspect ratios and tabularities of {111} tabular silver chloroiodide grains mentioned hereinbefore are related with the fact that particularly the requirement of high sensitivity and the particular advantages of spectrally sensitized tabular grains should be combined: the presence of iodide ions at the surface of silver chloroiodide tabular crystals already set forth hereinbefore is not only preferred from the viewpoint of crystal habit stability but particularly preferred as upon spectral sensitization an improved adsorption of the spectral sensitizer and an improved light absorption is obtained and as the quantum efficiency detected in the photochemical processes is increased.

As a consequence a more easy spectral sensitization may be expected due to an easy formation of e.g. J-aggregates, and/or due to the addition of higher amounts of spectral sensitizer(s) as a consequence of the presence of an enhanced specific surface of the tabular crystals, resulting in better photographic characteristics. Spectral sensitizers are preferably added in a total amount needed to reach an optimal coverage degree which, especially with a larger specific surface of tabular grains as mentioned hereinbefore may differ, from amounts added to cubic grains, with a factor of about 2 or even 3.

In the image-forming system according to the present invention silver chloroiodide grains, whether having an (essentially) cubic or a {111} tabular habit are spectrally sensitized with compounds selected from the group consisting of benzimidazoles, benzoxazoles, and a combination thereof. Especially a combination of benzimidazolo- and benzoxazolo-carbocyanines is preferred.

An example of a useful spectral sensitizer according to the general formula given above is anhydro-5,5'-dichloro-3,3'-bis(n-sulphobutyl)-9-ethyloxacarbocyanine hydroxide or anhydro-5,5'-di-chloro-3,3'-bis(n-sulphopropyl)-9-ethyloxacarbocyanine hydroxide. A suitable mixture of spectral sensitizers that is applied in the context of the present invention is anhydro-5,5'-dichloro-3,3'-bis(n-sulphobutyl)-9-ethyl oxacarbocyanine hydroxide or anhydro-5,5'-dichloro-3,3'-bis(n-sulphopropyl)-9-ethyloxacarbocyanine hydroxide together with anhydro-5,5'-dicyano-1,1'-diethyl-3,3'-di(2-acetoxyethyl)ethylimidacarbocyanine bromide.

Specific combinations of imidacarbocyanines and oxacarbocyanines as spectral sensitizers added to emulsions prior to chemical sensitization have e.g. been described in EP-A's 0 443 453 and 0 608 955 and in U.S. Pat. Nos. 5,296,345 and 5,338,655. Unsymmetrically chain substituted oxacarbocyanine dyes and/or imidacarbocyanine dyes suitable to improve dye stain and spectral sensitivity in the green short wavelength region have been given in JP-A 03-048235. Supersensitization with a symmetrical oxacarbocyanine dye in combination with a carbocyanine dye of e.g. the oxazole-imidazole type has been disclosed in U.S. Pat. Nos. 4,594,317 and 4,659,654. More in particular spectral sensitization of tabular grains with N-fluoro-alkyl substituted imidacarbocyanine dyes has been described in U.S. Pat. Nos. 4,675,279; 5,196,299; 5,210,014; and 5,466,822.

In classical emulsion preparation spectral sensitization traditionally follows the completion of chemical sensitization. However in connection with tabular grains, as already set forth hereinbefore, it is highly contemplated that spectral sensitization can occur simultaneously with or even precede completely the chemical sensitization step. It can be advantageous therefore to add an amount of a spectral sensitizing dye to the emulsion crystals just before cooling of the dispersion at the end of the growth step, but in principle the addition of the said dye may be performed at any stage of the precipitation, during or after redispersing or before, during or after chemical ripening. The addition can further be performed in one or more portions. In U.S. Pat. No. 5,286,621 it has e.g. been shown that spectral sensitizer is added in amounts ranging from $10^{-5}$ to $5\times10^{-3}$ moles per mole of silver halide as a whole after completion of the precipitation or in several fractions during and after the said precipitation.

Light-sensitive cubic silver chloroiodide grains may be spectrally sensitized with methine dyes such as those described by F. M. Hamer in "The Cyanine Dyes and Related Compounds", 1964, John Wiley & Sons. Dyes that may be used for the purpose of spectral sensitization include cyanine dyes, merocyanine dyes, complex cyanine dyes, complex merocyanine dyes, homopolar cyanine dyes, hemicyanine dyes, styryl dyes and hemioxonol dyes.

Cubic crystals rich in chloride may also be spectrally sensitized with one or more spectral sensitizers, chosen not only in favour of sensitometry but also in favour of decolorizing properties. Specific sensitizations with green-sensitizing imidaoxacarbo-cyanines have e.g. been described in U.S. Pat. Nos. 4,701,405; 5,219,723; 5,376,523; 5,462,850 and JP-B 95-013732. Spectral sensitizers having asymmetrical heterocycles may be useful with respect to improvements in residual coloration after processing.

An important factor influencing growth of silver nuclei in the preparation of silver chloroiodide grains is the choice of and the amount of protective colloid present in the reaction vessel or added simultaneously with one of the solutions added thereto during nucleation and further, eventually, after nucleation, during physical ripening before and/or during growth of the nuclei formed. The most well-known and practically used hydrophilic colloidal binder during precipitation of silver chloroiodide crystals is gelatin.

The preparation of conventional lime-treated or acid treated gelatin has been described in e.g. "The Science and Technology of Gelatin", edited by A. G. Ward and A. Courts, Academic Press 1977, page 295 and next pages. The gelatin can also be enzyme-treated as described in Bull. Soc. Sci. Phot. Japan, No. 16, page 30 (1966). A preparation method of tabular grain emulsions wherein in the grain growth process use is made of gelatin derivatives with chemically modified $NH_2$-groups and wherein said gelatin has a specific methionine content has been described in e.g. EP-A 0 697 618.

Gelatin may, however, be replaced in part or integrally by synthetic, semi-synthetic, or natural polymers. Synthetic substitutes for gelatin are e.g. polyvinyl alcohol, poly-N-vinyl pyrrolidone, polyvinyl imidazole, polyvinyl pyrazole, polyacrylamide, polyacrylic acid, and derivatives thereof, in particular copolymers thereof. Natural substitutes for gelatin are e.g. other proteins such as zein, albumin and casein, cellulose, saccharides, starch, and alginates. In general, the semi-synthetic substitutes for gelatin are modified natural products e.g. gelatin derivatives obtained by conversion of gelatin with alkylating or acylating agents, by grafting of polymerizable monomers on gelatin or prehardened gelatins with blocked functional groups as a consequence of this prehardening treatment, cellulose derivatives such as hydroxyalkyl cellulose, carboxymethyl cellulose, phthaloyl cellulose, and cellulose sulphates and even potato starch.

Further synthetic high molecular compounds described in JP-B-52-16365, Journal of The Society of Photographic Science and Technology of Japan, Vol. 29(1), 17, 22(1966), ibid., Vol. 30(1), 10, 19(1967), ibid., Vol. 30(2), 17(1967), and ibid., Vol. 33(3),24(1967) may be used as a dispersion medium. Also the crystal habit restraining agent described in EP-A 0 534 395 may be used.

Part of gelatin may further be replaced with a synthetic or natural high-molecular material.

An interesting substitute for gelatin may be silica as has been described in the published EP-A's 0 392 092, 0 517 961, 0 528 476, 0 649 051 and 0 704 749. As has been set forth in EP-A 0 528 476 a method of preparing a silver halide light-sensitive photographic material incorporating layers of silver halide precipitated in colloidal silica serving as a protective colloid is given. In this document the silver halides are prepared in colloidal silica, leading to emulsion crystals that are stable at the end of the precipitation, without however having a predictable mean crystal diameter and crystal size distribution. These problems have been overcome as has been described in EP-A 0 682 287, for the preparation of crystals rich in silver chloride, wherein circumstances wherein such crystals can be prepared are clearly defined: during the precipitation stage of regular silver chloroiodide crystals amounts of silica sol and of stabilizing onium compound(s), should be optimized in order to avoid uncontrolled formation and growth of aggregates.

For the precipitation processes wherein suitable silica sols are required as colloidal binder commercially available such as the "Syton" silica sols (a trademarked product of Monsanto Inorganic Chemicals Div.), the "Ludex" silica sols (a trademarked product of du Pont de Nemours & Co., Inc.), the "Nalco" and "Nalcoag" silica sols (trademarked products of Nalco Chemical Co), the "Snowtex" silica sols of Nissan Kagaku K.K. and the "Kieselsol, Types 100, 200, 300, 500 and 600" (trademarked products of Bayer AG). Particle sizes of the silica sol particles are in the range from 3 nm to 30 $\mu$m. The smaller particles in the range from 3 nm to 0.3 $\mu$m, and still more preferable from 3 nm up to 7 nm are preferred as the covering degree that can be achieved will be higher and as the protective action of the colloidal silica will be more effective.

At the end of the precipitation, following all possible physical ripening steps, the emulsion mixture is normally cooled to about 40° C., before or after adding a flocculate being a polymeric compound as e.g. polystyrene sulphonic acid, providing as a anionic polymer a behaviour depending on pH. Under carefully controlled conditions of addition and stirring rate the pH of the said dispersing medium is adjusted with an acid to a value in order to get a qualitatively good flocculate. Said flocculate may become decanted and washed with demineralized water in order to remove the soluble salts and the development inhibiting crystal habit modifier e.g. adenine to an allowable residual amount (preferably at most 0.3 mg/g of gelatin) or applying an ultrafiltration washing procedure as disclosed e.g. in Research Disclosure, Vol. 102, October 1972, Item 10208, Research Disclosure Vol. 131, March, Item 13122 and Mignot U.S. Pat. No. 4,334,012. Said ultrafiltration technique may be applied on-line during the whole precipitation, in order to reduce the increasing amount of water, thus avoiding dilution of the reaction vessel and increasing amounts of soluble salts like the mainly occurring potassium nitrate. Examples thereof have been described e.g. in EP-A 0 577 886.

When the emulsion after precipitation is washed by diafiltration by means of a semipermeable membrane, a technique also called ultrafiltration, it is not necessary to use polymeric flocculating agents that may disturb the coating composition stability before, during or after the coating procedure. Such procedures are disclosed e.g. in Research Disclosure Vol. 102, October 1972, Item 10208, Research Disclosure Vol. 131, March, Item 13122 and U.S. Pat. No. 4,334,012. Redispersion may further be performed by addition of extra hydrophilic colloid. As a consequence values of gesi and/or sisi may be enhanced up to values desired in order to prepare stable coating solutions. It is clear however that any useful protective colloid cited hereinbefore as an alternative of gelatin or gelatin in modified form may be used.

As already set forth additional gelatin or another hydrophilic colloid, suitable as a binder material can be added at a later stage of the emulsion preparation as e.g. after washing, in order to establish optimal coating conditions and/or to establish the required thickness of the coated emulsion layer. Preferably a gelatin to silver halide ratio, silver halide being expressed as an equivalent amount of silver nitrate, ranging from 0.3 to 1.0 is then obtained. Another binder may also be added instead of or in addition to gelatin. Useful vehicles, vehicle extenders, vehicle-like addenda and vehicle related addenda have been described e.g. in Research Disclosure No. 38957 (1996), Chapter II.

Prior to coating any thickening agent may be used in order to regulate the viscosity of the coating solution, provided that they do not particularly affect the photographic characteristics of the silver chloroiodide emulsion in the coated photographic material. Preferred thickening agents include aqueous polymers such as polystyrene sulphonic acid, dextran, sulphuric acid esters, polysaccharides, polymers having a sulphonic acid group, a carboxylic acid group or a phosphoric acid group as well as colloidal silica. Polymeric thickeners well-known from the literature resulting in thickening of the coating solution may even be used in combination with colloidal silica. Patents concerning thickening agents are e.g. U.S. Pat. No. 3,167,410; Belgian Patent No. 558.143 and JP-A's 53-18687 and 58-36768. Negative effects on physical stability possibly resulting from the addition of polymeric compounds can be avoided by exclusion of those compounds and by restricting extra additions of colloidal silica. In order to coat hydrophilic colloidal layer compositions on a support by slide-hopper or curtain-coating techniques, wherein said compositions have gelatin in low amounts in order to provide a ratio by weight of gelatin to silver halide expressed as an equivalent amount of silver nitrate in the range from 0.05 to 0.4, thickening agents composed of synthetic clay and anionic macromolecular polyelectrolytes wherein said synthetic clay is present in an amount of at least 85% by weight versus the total amount of thickening agents are recommended as has been disclosed in EP-A 0 813 105.

Photographic material having thin emulsion layers e.g. layers with a layer thickness of not more than 6 $\mu$m, containing at most 6 g of gelatin, more preferably from 2 $g/m^2$ up to 6 $g/m^2$ of gelatin, and even more preferably to about 3.5 $g/m^2$ offer the advantage that besides rapid processing applicability and the rapid drying of the wet processed material an improvement in sharpness is observed. Since the drying characteristics in the processor are mainly determined by the water absorption of the hydrophilic layers of the photographic material, and since the water absorption is directly proportional to the gelatin content of the layers and inversely proportional to the amount of hardener, added to the layer, its composition is optimized with a low gelatin content and a high hardening degree in order to allow hardener free processing within a total processing time cycle of from 30 to at most 60 seconds dry-to-dry, and, more preferably, at most 50 seconds.

In order to reach a high hardening degree the layer binder should of course dispose of an acceptably high number of functional groups, which by reaction with an appropriate hardening agent can provide a sufficiently resistant layer. Such functional groups are especially the amino groups, but also carboxylic groups, hydroxy groups, and active methylene groups. Hardeners may be added to the antistress layer, covering one or more light-sensitive silver halide emulsion layers rich in chloride before or during the coating procedure, or to one or more of the said emulsion layers. The binders of the photographic element, especially when the binder used is gelatin, can be hardened with appropriate hardening agents such as those of the epoxide type, those of the ethylenimine type, those of the vinylsulfone type e.g. 1,3-vinylsulphonyl-2-propanol, chromium salts e.g. chromium acetate and chromium alum, aldehydes e.g. formaldehyde, glyoxal, and glutaraldehyde, N-methylol compounds e.g. dimethylolurea and methyloldimethylhydantoin, dioxan derivatives e.g. 2,3-dihydroxy-dioxan, active vinyl compounds e.g. 1,3,5-triacryloyl-hexa-hydro-s-triazine, active halogen compounds e.g. 2,4-dichloro-6-hydroxy-s-triazine, and mucohalogenic acids e.g. mucochloric acid and mucophenoxy-chloric acid. These hardeners can be used alone or in combination. The binders can also be hardened with fast-reacting hardeners such as carbamoylpyridinium salts. Formaldehyde and phloroglucinol can e.g. be added respectively to the protective layer(s) and to the emulsion layer(s). Preferred hardening agents in the context of the present invention however are bis-(vinyl-sulphonyl)-methane (BVSME) and ethylene bis-(vinyl-sulphone).

Materials used in the image-forming system according to the present invention commonly have a hardening degree corresponding with a swelling degree of the layers of the material of less than 200% and even more preferably of not more than 150% as can be measured from thickness ratios of the layers of the material before and after immersion in demineralized water of 25° C. for 3 minutes.

A lot of other ingredients are further required in order get suitable sensitometric properties, as e.g. sensitivity (also called speed), gradation (also called contrast and specified in the toe, the linear part and/or the shoulder of the characteristic curve), fog and maximum density in preferred rapid processing conditions for the materials coated from silver chloroiodide emulsions used in the image-forming system according to the present invention.

Therefore compounds preventing the formation of fog or stabilizing the photographic characteristics during the production or storage of the photographic elements or during the photographic treatment thereof are required and are in most cases already present during emulsion precipitation and/or (spectral and/or chemical) sensitization. Many known compounds can be added as fog-inhibiting agent or stabilizer to the silver halide emulsion layer or to other coating layers in water-permeable relationship therewith such as an undercoat or a protective layer. Suitable examples are e.g. those described in Research Disclosure No. 17643 (1978), Chapter VI and in RD No. 38957 (1996), Chapter VII.

The photographic element may further comprise various kinds of coating physical property modifying addenda as described in RD No. 38957 (1996), Chapter IX, wherein coating aids, plasticizers and lubricants, antistats and matting agents have been described.

Development acceleration can be accomplished by incorporating in emulsion layer(s) or adjacent layers various compounds, preferably wg polyalkylene derivatives having a molecular weight of at least 400 such as those described in e.g. U.S. Pat. Nos. 3,038,805; 4,038,075 and 4,292,400 as well as in EP-A's 0 634 688 and 0 674 215.

The photographic element may further comprise various other additives such as e.g. compounds improving the dimensional stability of the photographic element, ultraviolet absorbers and spacing agents. Suitable additives for improving the dimensional stability of the photographic element are e.g. dispersions of a water-soluble or hardly soluble synthetic polymer e.g. polymers of alkyl(meth) acrylates, alkoxy(meth)acrylates, glycidyl (meth)acrylates, (meth)acrylamides, vinyl esters, acrylonitriles, olefins, and styrenes, or copolymers of the above with acrylic acids, methacrylic acids, α,β-unsaturated dicarboxylic acids, hydroxyalkyl (meth)acrylates, sulphoalkyl (meth)acrylates, and styrene sulphonic acids.

Suitable UV-absorbers are e.g. aryl-substituted benzotriazole compounds as described in U.S. Pat. No. 3,533,794, 4-thiazolidone compounds as described in U.S. Pat. Nos. 3,314,794 and 3,352,681, benzophenone compounds as described in JP-A 56-2784, cinnamic ester compounds as described in U.S. Pat. Nos. 3,705,805 and 3,707,375, butadiene compounds as described in U.S. Pat. No. 4,045,229, and benzoxazole compounds as described in U.S. Pat. No. 3,700,455 and those described in RD No. 38957 (1996), Chapter VI, wherein also suitable optical brighteners are mentioned.

Spacing agents may be present of which, in general, the average particle size is comprised between 0.2 and 10 μm. Spacing agents can be soluble or insoluble in alkali. Alkali-insoluble spacing agents usually remain permanently in the photographic element, whereas alkali-soluble spacing agents usually are removed therefrom in an alkaline processing bath. Suitable spacing agents can be made e.g. of polymethyl methacrylate, of copolymers of acrylic acid and methyl methacrylate, and of hydroxypropylmethyl cellulose hexahydrophthalate. Other suitable spacing agents have been described in U.S. Pat. No. 4,614,708.

In X-ray photography a material has a single or a duplitized emulsion layer coated on one (single-side coated) or both sides (double-side coated) of the support respectively. This invention is related with double-side coated materials comprising silver chloroiodide emulsion grains as discussed hereinbefore.

A mixture of two or more emulsions having silver chloroiodide crystals with the same or different crystal sizes, the same or a different crystal habit, a different or the same chemical ripening treatment and/or a different or the same coverage degree with one or more spectral sensitizers being different from each other or the same as those described hereinbefore, may be added to at least one light-sensitive emulsion layer, provided that at least one emulsion has crystals ripened with one or more selenium compounds generating silver selenide in an emulsion comprising said grains at a temperature of from 45° C. up to 70° C. at an electrical potential difference between a silver electrode and a saturated calomel reference electrode of from 100 up to 200 mV. Double-side coated materials wherein said crystals can advantageously be used have e.g. been described in U.S. Pat. No. 5,397,687; in EP-A 0 678 772 and in EP-A's 0 754 972 and 0 754 971.

It is repeated that besides selenium sensitizers said monodisperse cubic and/or {111} tabular silver chloroiodide grains have further been chemically ripened in the presence of one or more sulphur and/or gold compounds. In the image-forming system according to the present invention said sulphur compound(s) is(are) one or more compound(s) selected from the group consisting of tetramethylthiodithiocarboxylic acid diamide, dimethylaminodithiomercaptane, thiosulphate and thiosulphonate compounds.

If more than one emulsion layer is coated onto at least one side of the double-side coated support the same or different emulsions or emulsion mixtures may be present in the different layers. If the same emulsion or emulsion mixture is present in different emulsion layers distinct amounts of (same or different) spectral sensitizer may have been added during chemical riping and/or preparation for coating in order to get a broader exposure latitude for the material according to the image-forming method of the present invention and less sensitometric fluctuations in the processing of the hardcopy material. If more than one spectral sensitizer is used, wherein at least one of them is absorbing to a differing wavelength region, it is preferred to add them to different layers too, and still more preferred to add them to layers situated at different sides of the support as wandering of spectral sensitizers may form a problem. Such arrangement has e.g. been described in e.g. U.S. Pat. Nos. 4,978,599 and 5,380,636.

Besides the light-sensitive emulsion layer(s) the photographic material may contain several light-insensitive layers at the side of the support carrying said light-sensitive emulsion layer(s), e.g. a protective antistress layer which can be split up into two layers, one of them being an underlying interlayer or an outermost afterlayer coated or sprayed on top of the "basic" protective antistress layer, one or more subbing layers, one or more intermediate layers e.g. filter layers and even an afterlayer containing e.g. hardening agent(s), antistatic agent(s), filter dyes for safety-light purposes etc.

Protective antistress layers preferably contain coating aids and coating physical property modifying addenda mentioned in RD No. 38957, published September 1996, Chapter IX. Antistatic properties are especially preferred in order to prevent blackening after processing in form of sparks, etc. due to abrupt decharging of electrostatic charges during production and/or handling before exposure and/or processing. It is highly preferred to add antistatic agents to the protective antistress layer or to an afterlayer coated thereupon as has been described e.g. in EP-A's 0 534 006, 0 644 454 and 0 644 456 and in U.S. Pat. Nos. 4,670,374 and 4,670,376. Abrasion resistance of these outermost layers may be improved as described in U.S. Pat. Nos. 4,766,059 and 4,820,615. Spraycoating of afterlayers has been disclosed e.g. in U.S. Pat. No. 5,443,640. Non-imagewise blackening occurring as a result of pressure sensitivity of silver halide grains rich in chloride is lowered in the present invention due to the presence of iodide ions at the grain surface of tabular as well as cubic crystals. Measures in order to further suppress pressure sensitivity may be coating of enhanced amounts of binder as e.g. gelatin. This however is disadvantageous with respect to rapid processing and therefore as an alternative silver chloroiodide prepared in silica may offer an alternative as has been disclosed e.g. in EP-A 0 528 476. Moreover with respect to the binder material in the light-sensitve emulsion layer an improvement of pressure sensitivity can be expected if use is made therein from synthetic clays as has been disclosed in U.S. Pat. No. 5,478,709. In the presence however of spectral sensitized emulsion crystals in the said light-sensitive layers care should be taken in order to select suitable synthetic clays as has been disclosed e.g. in EP-A 0 757 285.

Intermediate layers eventually containing filter- or antihalation dyes that absorb scattering light and thus promote the image sharpness have been described in e.g. U.S. Pat. Nos. 4,092,168; 4,311,787; 5,344,749; 5,380,634; 5,474,881; 5,478,708; 5,502,205; in EP-A 0 489 973 and 0 586 748 and in EP-A's 0 786 497 and 0 781 816; in DE 2,453,217, and in GB-A 1 907 440. Situated in such an intermediate layer between the emulsion layers and the support there will be only a small negligible loss in sensitivity but rapid processing conditions, although said dyes decolorize very rapidly in alkaline solutions, require minimization of the thickness of the whole coated layer, an item which has already been discussed hereinbefore: multilayer arrangements of thin layers clearly result in shorter drying times after washing in the processing cycle. It is further in favour of decolorizing properties to have said suitable dyes in form of finely dispersed form and more preferred in solid particle dispersed form. Evidence therefore is specifically given in EP-A 0 724 191 and in a more general way in EP-A 0 756 201.

In addition thereto it is recommended to prepare aqueous solid dispersions in colloidal silica for any photographically useful compound as has been suggested e.g. in EP-A 0 569 074. Advantages with respect to thin layer coating and rapid processing ability can be expected with relation thereto, without enhancing pressure sensitivity of more vulnerable layers.

The support of the photographic materials comprising silver halide emulsions with silver chloroiodide crystals used for X-ray imaging, may be a transparent resin, preferably a blue colored polyester support like polyethylene terephthalate. The thickness of such organic resin film is preferably about 175 μm. Other hydrophobic resin supports are well known to those skilled in the art and are made e.g. of polystyrene, polyvinyl chloride, polycarbonate and polyethylene naphthalate. The support is further provided with a substrate layer at both sides to have good adhesion properties between the adjacent layers and said support: one or more subbing layers known to those skilled in the art for adhering thereto a hydrophilic colloid layer may be present. Suitable subbing layers for polyethylene terephthalate supports are described e.g. in U.S. Pat. Nos. 3,397,988, 3,649,336, 4,123,278 and 4,478,907. A preferred layer arrangement wherein a subbing layer composition comprising as a latex copolymer vinylidene chloride, methylacrylate and itaconic acid has been covered with hydrophilic layers being at least one gelatinous dye containing layer comprising one or more dyes, at least one silver halide emulsion layer, at least one protective antistress layer, and optionally an afterlayer has been described in EP-A 0 752 617. In that invention said hydrophilic layers have a swelling ratio of not more than 200% and in said hydrophilic layers are coated simultaneously by the slide-hopper coating or by the slide-hopper curtain coating technique. Further information on suitable supports can be found in RD No. 38957, Chapter XV, published September 1996.

In radiography the interior of objects is reproduced by means of penetrating radiation which is high energy radiation belonging to the class of X-rays, γ-rays and high energy elementary particle radiation, e.g. β-rays, electron beam or neutron radiation. For the conversion of penetrating radiation into visible light and/or ultraviolet radiation luminescent substances are used called phosphors. In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation whereto a photographic film is made more sensitive: it is clear that spectral sensitizers are chosen as a function of and in order to absorb light of about the same wavelength range as the one emitted by luminescent phosphors coated in phosphor layers of intensifying screens brought into contact with the double-side coated film materials during X-ray exposure.

So according to the present invention in the image-forming system silver chloroiodide crystals are spectrally sensitized in the green-wavelength range of the spectrum as e.g. described in GB 1 489 398; in U.S. Pat. Nos. 4,431,922 and 4,710,637. More particlarly silver chloroiodide crystals are spectrally sensitized between 520 and 580 nm, and have a maximum absorption between 540 and 550 nm in order to absorb light emitted from X-ray exposed screens coated from preferred green-light emitting gadolinium oxisulphide phosphors. Such phosphors suitable for use in a conventional radiographic system must have a high prompt emission on X-ray irradiation and low afterglow in favour of image-sharpness. Especially terbium activated gadolinium oxisulphide phosphor crystals are particularly suitable for use in the image-forming system according to the present invention. Screen-film systems wherein green-light emitting screens are used in contact with green sensitized silver halide films have been described e.g. in EP-A 0 678 772.

In the practical application wherein the image-forming system according to the present invention is used, an X-ray radiation source is used having an energy of from 60 to 150 kVp, e.g. 80 kVp for the detection of bone.

From the preceding description of the X-ray recording system operating with X-ray conversion phosphor screens in the form of a plate or panel it is clear that said plates or panels only serve as intermediate imaging elements and do not form the final record. The final image is made or reproduced on a separate recording medium or display: for X-ray conversion screens used in the image-forming system of the present invention double-side coated films are the said final record. It is clear that the phosphor plates or sheets can be repeatedly re-used. Since in the above described X-ray recording systems the X-ray conversion screens are used repeatedly, it is important to provide them with an adequate topcoat for protecting the phosphor containing layer from mechanical and chemical damage. Further providing a relief structure that effectively improves manipulation should not be at the cost of image quality as providing protruding particles requires increased thickness of the protective coating and as a consequence reduced image sharpness due to an increased distance between the radiation emitting phosphor layer and the radiation sensitive coating of the photographic film in contact therewith. Not only the increased thickness itself can give rise to increased unsharpness of the emitted light when the refractive indices of phosphor binder and binder of the protective coating differ but also the presence of the particles themselves having different refractive index compared with that of the binder of the protective coating. A good compromise in order to provide a luminescent article, e.g. in the form of a plate, panel or web, comprising a phosphor-binder layer and protective coating applied thereto wherein the protective layer has a relief structure for high ease of manipulation, thereby avoiding sticking, friction and electrostatic attraction with maintenance of an excellent image resolution has been described in EP-A 0 510 754.

From the point of view of the phosphor layer especially an increased thickness itself can give rise to increased unsharpness of the emitted light, this being the more unfavorable if the weight ratio between the amount of phosphor particles and the amount of binder decreases for the same coating amount of said phosphor particles, also called "pigment". Enhancing the weight ratio amount of pigment to binder to provide sharper images, by decreasing the amount of binder leads to unacceptable manipulation characteristics of the screen due to e.g. insufficient elasticity and brittleness of the coated phosphor layer in the screen.

One way to get thinner coated phosphor layers in favour of sharpness of the image on the film material in contact therewith during exposure and without changing the coated amounts of pigment and of binder makes use of a method of compressing the coated layer as has been described in EP-A 0 393 662. A much better solution in order to provide a phosphor layer having a ratio by volume of pigment to binder to obtain an excellent image resolution with the maintenance of a high ease of manipulation, thereby providing a good elasticity of the screen, good adhesion properties between the support and the phosphor layer and avoiding brittleness of the said phosphor layer has been described in WO94/000531, wherein the binding medium of the phosphor layer substantially consists of one or more rubbery and/or elastomeric polymers, in that the ratio by volume of phosphor to binding medium is at least 70:30 and at most 92:8 and in that the packing ratio is less than 67%. By the choice of the type of binder and the high volume ratio of phosphor to binder it is possible to obtain thin phosphor coatings offering not only high resolution but also high sensitivity without the need for increasing the packing density by compressing so as to reduce the voids as defined in EP-A 0 393 662 to a value of not less than 70%. Moreover the phosphor layer retains high protection against mechanical damage and thus high ease of manipulation. A practically useful binder medium for the phosphor particles has further been disclosed in WO94/000530. Therein the binding medium substantially consists of one or more hydrogenated styrene-diene block copolymers, having a saturated rubber block, as rubbery and/or elastomeric polymers. The polymer can be represented by the formula A-B-A (tri-block) or by the formula A-B (di-block), wherein A represents styrene and B represents the hydrogenated diene block e.g. ethylene-butylene or ethylene-propylene.

Screen/film combinations may be symmetric or asymmetric: this means that screens differing in speed and/or radiation emitted therefrom are differing and/or that there is a difference in speed and/or contrast and/or spectral sensitivity at both sides of the film support.

As exposure light is diffracted less by silver halide crystals rich in chloride due to less light absorption, as has been illustrated in EP-A 0 580 029, a further advance with respect to image sharpness may be expected in comparison with silver halide crystals rich in silver bromide. Further as a result of the better solubility of silver halide crystals rich in silver chloride if compared with crystals rich in silver bromide, it can be expected that with respect to rapid processing ability materials comprising emulsions having silver halide crystals rich in chloride will be more favorable.

A method of image formation offered as described in the present invention comprises the step of processing said film material after exposure with light emitted by a green-light emitting phosphor of an intensifying screen after conversion of X-rays having an energy from 60 to 150 kVp, wherein said step of processing proceeds in an automatic processor.

The image-forming method of the present invention further comprises the step of processing said film material used in the image-forming system described hereinbefore, wherein said processing comprises the steps of developing in a developing solution comprising (iso)ascorbic acid, 1-ascorbic acid, reductic acid, salts and/or derivatives thereof; fixing in a fixer solution free from aluminum salts; rinsing and drying.

Preferably replenishing said developing and fixer solution proceeds with amounts of replenisher in the range from 100 up to 200 ml/$m^2$ and from 50 up to 150 ml/$m^2$ respectively. For the said processing, preferably an automatically operating apparatus is used provided with a system for automatic replenishment of the processing solutions. The processing therein proceeds within a short processing time of from 30 up to 60 seconds from dry-to-dry, and more preferably from 30 up to 50 seconds, for materials used in the image forming system of the present invention. A normally used configuration in the automatic processing apparatus shows the following consecutive tank units corresponding with, as consecutive solutions: developer-fixer-rinse water.

Recent developments however have shown, that from the viewpoint of ecology and especially with respect to reduction of replenishing amounts, as consecutive solutions the sequence developer-fixer-fixer-rinse water-rinse water is preferred. One washing step between developing and fixation and one at the end before drying may also be present.

Instead of or partially substituting (e.g. in a ratio by weight of from 1:1 up to 9:1) the ecologically questionable "hydrocuinone" (iso)ascorbic acid, 1-ascorbic acid and tetramethyl reductic acid are preferred as main developing agent in the developer. Said developing agents have been described e.g. in EP-A's 0 461 783, 0 498 968, 0 690 343, 0 696 759, 0 704 756, 0 732 619, 0 731 381 and 0 731 382; in U.S. Pat. Nos. 5,474,879 and 5,498,511 and in RD No. 371052, published Mar. 1, 1995, wherein a more general formula covering the formula of said developing agents has been represented.

In order to reduce "sludge formation" which is favored by solubilizing agents like sulphites, present in the developer as preservatives, a particularly suitable developer solution is the one comprising a reduced amount of sulphite and ascorbic acid which acts as a main developer and anti-oxidant as well and which is called "low-sludge" developer.

In favour of ecological fixation the presence of aluminum ions should be reduced, and more preferably, no aluminum ions should be present. This is moreover in favour of the absence of "sludge" formation, a phenomenon which leads to pi-line defects when high amounts of silver are coated in the light-sensitive layers. Measures in order to reduce "sludge-formation" have further been described in U.S. Pat. Nos. 5,447,817; 5,462,831 and 5,518,868. A particularly suitable fixer solution comprises an amount of less than 25 g of potassium sulphite per liter without the presence of acetic acid wherein said fixer has a pH value of at least 4.5, in order to make the fixer solution quasi odorless. The presence of aketocarboxylic acid compounds may be useful as has been described in EP-A's 0 620 483 and 0 726 491 and in RD 16768, published March 1978. It is possible to use sodium thiosulphate as a fixing agent, thus avoiding the ecologically undesired ammonium ions normally used. For low coating amounts of emulsion crystals rich in chloride a fixation time which is reduced to about 2 to 10 seconds can be attained.

The developer solution used in the method according to this invention should be replenished not only for decrease of the liquid volume due to cross-over into the next processing solution but also for pH-changes due to oxidation of the developer molecules. This can be done on a regular time interval basis or on the basis of the amount of processed film or on a combination of both. In these circumstances, no dilution and mixing procedures are required before the regeneration bottles are adjusted to the processing unit. Moreover regeneration is kept to a minimum, especially in the processing of materials coated from very low amounts of emulsion crystals rich in silver chloride. Preferred minimum regeneration or replenishment amounts are from 100 to 200 $ml/m^2$ and more preferably from 100 to 150 $ml/m^2$ for the developer and from 50 to 150 $ml/m^2$ and more preferably from 50 to 100 $ml/m^2$ or the fixer solution. Replenishment of a developer comprising ascorbic acid or derivatives thereof and a 3-pyrazolidone derivative has been described in EP-A 0 573 700, wherein a method is disclosed for processing with constant activity image-wise exposed silver halide photographic material comprising the steps of (a) developing photographic material in a continuous automatic way by means of a developing solution containing an ascorbic acid analogue or derivative and a 3-pyrazolidone derivative as developing agents;

(b) replenishing said developing solution by means of at least one replenishing solution having a higher pH than the developing solution.

Other references related therewith are EP-A 0 552 511 and U.S. Pat. No. 5,503,965 and further in EP-A 0 660 175 and EP-Applications Nos. 96203727, filed Dec. 30, 1996 and 97203096, filed Oct. 6, 1997.

Although it is possible to use whatever a processing unit adapted to the requirements described hereinbefore to reach the objectives concerning a perfect link between rapid processing and ecology, the objects of this invention concerning processing have e.g. been realised in the processing unit CURIX HT 530, trade name product marketed by Agfa-Gevaert.

New developments however have become available with respect to processing apparatus. In a conventional processing apparatus the sheet material is transported along a generally horizontal feed path, the sheet material passing from one vessel to another usually via a circuitous feed path passing under the surface of each treatment liquid and over dividing walls between the vessels. However, processing machines having a substantially vertical orientation have also been proposed, in which a plurality of vessels are mounted one above the other, each vessel having an opening at the top acting as a sheet material inlet and an opening at the bottom acting as a sheet material outlet or vice versa. In the present context, the term "substantially vertical" is intended to mean that the sheet material moves along a path from the inlet to the outlet which is either exactly vertical, or which has a vertical component greater than any horizontal component. The use of a vertical orientation for the apparatus leads to a number of advantages. In particular the apparatus occupies only a fraction of the floor space which is occupied by a conventional horizontal arrangement. Furthermore, the sheet transport path in a vertically oriented apparatus may be substantially straight, in contrast to the circuitous feed path which is usual in a horizontally oriented apparatus. The straight path is independent of the stiffness of the sheet material and reduces the risk of scratching compared with a horizontally oriented apparatus. In a vertically oriented apparatus, it is important to avoid, or at least minimise leakage of treatment liquid from one vessel to another and carry-over as the sheet material passes through the apparatus. Furthermore it is desirable that the treatment liquid in one vessel is not contaminated by contents of the adjacent vessels, that is neither by the treatment liquid of the next higher vessel nor by vapors escaping from the next lower vessel. In order to reduce consumption of treatment liquids, it is furthermore desirable to reduce the evaporation, oxidation and carbonization thereof. A solution therefore has been proposed in EP-A 0 744 656, wherein it has been disclosed that contamination and evaporation, oxidation and carbonization can both be reduced in a simple manner by a particular construction of the apparatus for the processing of photographic sheet material comprising a plurality of cells mounted one above the other in a stack to define a substantially vertical sheet material path through the apparatus, each cell comprising a housing within which is mounted a rotatable roller biased towards a reaction surface to define a roller nip there-between through which the sheet material path extends and associated sealing means serving to provide a gas- and liquid-tight seal between the roller and reaction surface on the one hand and a wall of the housing on the other. According to a first aspect, invention is characterized by means for connecting each cell to adjacent cells in the stack in a closed manner and according to a second aspect, the invention is characterized in that the roller is a drive roller.

Particularly the objectives set forth above may be achieved when the developing cell of the apparatus is a closed cell and the developing liquid contains an ascorbic acid developing agent as has been described in EP-Application No. 96201753, filed Jun. 24, 1996. According to that invention, there is provided a method of processing photographic sheet material by use of an apparatus comprising a plurality of processing cells so arranged in order to define a sheet material path through the apparatus, at least one of the cells constituting a developing cell containing a developing liquid, characterized in that the developing cell is a closed cell and the developing liquid contains an ascorbic acid type developing agent.

With respect to further characteristics of the processing apparatus reference is made to EP-A 0 819 992, wherein it was an object to provide an apparatus in which operating components can easily be replaced without the need for substantial re-programming of the CPU. This could be achieved when information concerning characteristics of each operating component is stored in separate memory means.

As a rule, a processing apparatus for photographic sheet material comprises several treatment cells, most or all of which are in the form of vessels containing a treatment liquid, such as a developer, a fixer or a rinse liquid. As used herein, the term "sheet material" includes not only photographic material in the form of cut sheets, but also in the form of a web unwound from a roll. The sheet material to be processed is transported along a sheet material path through these vessels in turn, by transport means such as one or more pairs of path-defining drive rollers, and thereafter optionally to a drying unit. The time spent by the sheet material in each vessel is determined by the transport speed and the dimensions of the vessel in the sheet feed path direction.

From time to time it is necessary to clean the processing apparatus, in order to remove debris which may derive from the sheet material itself and deposits derived from the treatment liquids. The usual process for cleaning a processing apparatus, whether of the vertical or horizontal configuration, is to drain the treatment liquids and to flush the apparatus through with cleaning liquid. Water, optionally containing various additives and optionally at an elevated temperature, is the usual cleaning liquid. Therefore it has ever been an object to provide an apparatus in which the path-defining rollers can be separated from each other in the open position, in a simple and convenient manner. The way in which this can be achieved has been described in EP-Application No. 96202164, filed Aug. 31, 1996, wherein the path-defining rollers are supported by bearings carried by eccentric sleeves which are stationary in the closed position, and where means are provided for partly rotating the sleeves thereby to withdraw the path-defining rollers from each other into the open position. A sheet material processing apparatus has thus been provided, comprising at least one treatment cell, a pair of rotatable path-defining rollers defining a sheet material path through the cell, the path-defining rollers having a closed position in which the path-defining rollers are biased into contact with each other to form a nip through which the sheet material path extends and an open position in which the path-defining rollers are spaced from each other, characterized in that the path-defining rollers are supported by bearings carried by eccentric sleeves which are stationary in the closed position, and means are provided for partly rotating the sleeves thereby to withdraw the path-defining rollers from each other into the open position.

It is clear that within the scope of the present invention any combination of two green-light emitting intensifying screens with a double-side coated film may be used, wherein said film comprise cubic and/or {111} tabular silver chloroiodide emulsion crystals coated from minimum amounts of silver, still offering after exposure by X-rays converted to green light, a sufficient covering power (see therefore e.g. EP-A 0 709 730) in rapid ecological processing (with ascorbic acid and/or derivatives thereof as developing agent (s) in a hardener-free developer and an odor-free fixer, free from aluminum ions, thereby reducing sludge; wherein replenishing amounts for developer and fixer are as low as possible) and provided that an optimal relationship is attained between sensitometry and image quality, especially sharpness, partly thanks to low cross-over exposure for said double-side coated films.

EXAMPLES

Example 1

This example demonstrates the advantages of emulsions comprising cubic AgCl(I) crystals having been chemically sensitized with chemically sensitizing compounds comprising selenium over other chemically sensitizing compounds.

| Preparation of Emulsion A | |
|---|---|
| Solution 1 | |
| Water | 880 ml |
| Gelatin | 46 g |
| Potassium iodide | 5 g |
| Solution 2 | |
| Water | 1000 ml |
| Silver nitrate | 500 g |
| Solution 3 | |
| Water | 1025 ml |
| Sodium chloride | 59.7 g |

The UAg value of solution 1 (potential value expressed in mV versus a saturated silver/silver chloride reference electrode) was adjusted at a constant value of +138 mV before starting nucleation by dropwise addition of about 7 ml of a solution having 234 grams of sodium chloride after addition of 0.44 ml of a silver nitrate solution having a concentration of 50 g per liter of demineralized water.

During the said nucleation step which was performed at a constant temperature of 60° C., there was simultaneously added to solution 1, while stirring at a stirring rate of 500 rpm, a part of solution 2 and of solution 3 over a period of 5 minutes at a flow rate of 3 ml/min. After this nucleation step, UAg was readjusted at the same value of +138 mV while solution 2 was added at an increasing flow rate varying from 3 ml per minute to 30 ml per minute simultaneously with solution 3, the flow rate of which was varied in order to maintain the same constant UAg-value over a period of 56 minutes and 5 seconds, meanwhile maintaining UAg at the same constant UAg value of +138 mV.

The emulsion was washed with a solution of demineralized water containing 0.46 g of sodium chloride per liter after flocculation by addition of polystyrene sulphonic acid to the acidified emulsion. To the washed flocculate 130 g of gelatin was added, followed by redispersion. In this way a cubic silver chloroiodide emulsion having a mean grain size of 0.48 μm with a chloride content of 99 mole % and an iodide content of 1 mole % was obtained.

solutions were coated on a polyethylene terephthalate support in such an amount in order to give a coating weight of 3.75 $g/m^2$ per side in terms of $AgNO_3$ and 1.9 g of gelatin per $m^2$ per side.

The following protective layer was coated thereupon (pH value: 6.1)

| Protective layer | |
|---|---|
| Gelatin | 1.1 $g/m^2$ |
| Polyethyl acrylate latex | 500 $mg/m^2$ |
| Kieselsol | 15 $mg/m^2$ |
| Chromium acetic acid | 5.5 $mg/m^2$ |
| Compound (1) | 7.5 $mg/m^2$ |
| Compound (2) | 19 $mg/m^2$ |
| Mobilcer Q | 25 $ml/m^2$ |
| Compound (3) | 8 $mg/m^2$ |

$NH_3$

Compound (1)

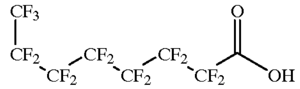

Compound (2):

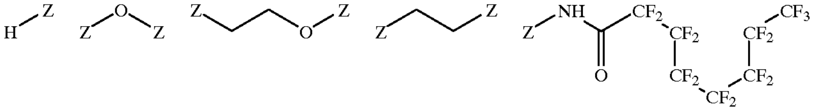

Compound (3):

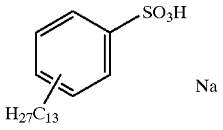

The pH of the said emulsion was adjusted at 5.15; the pAg at 7.00. To the dispersion obtained as described hereinbefore 5 mg of para-toluene thiosulphonate, 1 g of potassium iodide, 15 mg of chloro auric acid, 30 mg of ammonium thiocyanate and 25 mg of tetramethylthio-dithiocarboxylic acid diamide and $3.3 \times 10^{-6}$ of a compound comprising Se as indicated in the Table were added at 40° C.

Chemical sensitization was carried out at 46° C. during 150 minutes.

Spectral sensitization was carried out by means of a mixture of 0.05 mmoles of anhydro-5,5'-diphenyl-3,3'-bis (n-sulphato-propyl)-9-ethyl-oxacarbocyanine hydroxide and 0.09 mmoles of anhydro-5,5'-di-chloro-3,3'-bis(n-sulphobutyl)-9-ethyloxacarbocyanine hydroxide. Further, 40 mg (per mole of Ag) of 1-phenyl-5-mercaptotetrazole and 150 mg (per mole of Ag) of 1-p-carboxy-phenyl-5-mercaptotetrazole were added as stabilizers. Resorcinol was added as hardener accelerator in an amount of 2.8 g per mole of Ag.

Consecutively 0.5 g of polyglycol (MW=6000) was added as a development accelerator; 20 ml of polyoxyethylene surfactant $H_{17}C_8$-Phenyl-$(O—CH_2—CH_2)_8—O—CH_2—COOH$ and in an amount of 140 mg (per mole of Ag) fluoroglucinol was added as a hardener stabilizer together with polymethyl acrylate latex (in an amount of 140% by weight, based on the amount of gelatin binder) which was used as a plasticizer. The thus prepared emulsion coating

Evaluation of the Coated Samples

An X-ray exposure proceeded with 68 kVp X-rays and an ANSI-phantom was exposed at the screen-film system wherein the screen was an ORTHO REGULAR NEW screen, trademarketed product from Agfa-Gevaert, wherein the film was variable (see Emulsions A to G in Table 1). The density of the curve obtained was plotted versus the corrected logK value, wherein said value is corrected for the air absorption. The processing of the exposed silver halide emulsion materials A to G proceeded with the following developing liquid INVDEV, followed by fixing in fixing liquid INVFIX and rinsing at the indicated temperature of 35° C. and processing time of 45 seconds.

Compound (4):

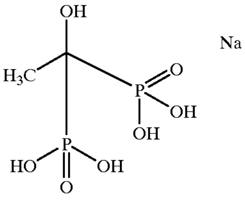

| Developer INVDEV | |
|---|---|
| 1-phenyl-4-methyl-4'hydroxymethyl-3-pyrazolidine-1-one | 2 g/l |
| Sodium EDTA | 2 g/l |
| Potassium bromide | 3.3 g/l |
| Potassium thiocyanate | 1 g/l |
| Potassium sulphite | 33 g/l |
| Potassium carbonate | 96 g/l |
| Polyglycol (M.W. = ca. 400) | 20 ml/1 |
| Compound (4) | 1 g/l |
| Ascorbic Acid | 50 g/l |
| pH ready-for-use | 10.0 |

The developed samples were fixed in fixer INVFIX, followed by rinsing with water.

The composition of the said fixer was as follows:

| Fixer INVFIX | |
|---|---|
| -Ammonium thiosulphate (60% solution, wherein 1 ml comprises 0.778 g) | 710 ml |
| -Sodium metabisulphite | 80 g |
| -Sodium acetate | 130 g |
| -Acetic acid | 31 ml |
| pH ready-for-use (after dilution 1 + 3) | 4.90 |

Differences in sensitometric properties obtained for film-screen combinations for the freshly prepared material and the same materials after conditioning for 3 days in a room having a temperature of 57° C. and a relative humidity of 34% are given in Table 1 hereinafter, together with the prefix "δ", followed by the corresponding parameter.

The said sensitometric differences are expressed for fog levels F, determined as minimum densities above support density, wherein densities are multiplied by a factor of 1000;

speed values S, determined at a density of 1.0 above fog level, wherein said values are multiplied by a factor of 100 (a negative difference is indicative for a loss in speed);

gradation levels GG, wherein differences are expressed as a procentual figure: GG-gradation values are determined between a density of 1.0 and 3.0 above fog level;

Dmax: maximum densities obtained, multiplied by a factor of 100.

TABLE 1

| Em. | Se-cmpd. | Fog (δ Fog) | Speed (δ Speed) | GG δGG % | Dmax δDmax | LIRF 0.1 – 0.01 s | Screen Speed |
|---|---|---|---|---|---|---|---|
| A | — | 48 | 197 | 373 | 391 | 0.03/0.20 | 0.28 |
| | | 12 | - 5 | - 11 | - 36 | - 17 | |
| B | I | 65 | 175 | 330 | 356 | −0.22/ | 0.57 |
| | | 38 | + 1 | - 6 | - 22 | −0.15 | |
| | | | | | | - 7 | |
| C | VIII | 320 | 175 | 265 | 360 | −0.30/ | 0.57 |
| | | 413 | - 4 | - 20 | - 22 | −0.22 | |
| | | | | | | - 8 | |
| D | II | 48 | 184 | 351 | 363 | −0.13/ | 0.51 |
| | | 20 | + 2 | - 2 | - 25 | −006 | |
| | | | | | | - 7 | |
| E | III | 59 | 177 | 333 | 367 | −0.19/ | 0.56 |
| | | 41 | + 1 | - 7 | - 22 | −0.12 | |
| | | | | | | - 7 | |
| F | VI | 172 | 178 | 296 | 355 | −0.23/ | 0.55 |
| | | 228 | - 1 | - 13 | - 21 | −0.15 | |
| | | | | | | - 8 | |
| G | VII | 62 | 176 | 323 | 346 | −0.21/ | 0.57 |
| | | 26 | - 3 | - 4 | - 18 | −0.14 | |
| | | | | | | - 7 | |

For the selenium compound according to the formula VIII in the Table 1 the formula is given hereinafter.

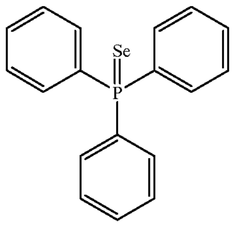

triphenylphosphine selenide (formula VIII)

As a reference the screen speed of a CURIX HTU film (trademarketed product from Agfa-Gevaert NV) has a value of 0.63.

Values of low intensity reciprocity failures in speed are expressed herein as differences in speed, obtained for exposure times between 0.1 and 0.01 seconds and are also added to the Table 1.

As can be concluded from the figures given in the Table 1, use of the selenium compounds VI and VIII, however leading to an improved speed level, gives higher differences in fog level after conditioning of the films: this could be expected as fog levels were already higher for the freshly prepared materials coated from emulsions having silver chloroiodide crystals chemically ripened with the said selenium compounds. Except for the said compounds VI and VIII, selenium compounds suitable for use in the image-forming system of the present invention give, besides a clearly increased speed (sensitivity) a still acceptable fog density level which exceeds the fog level of the comparative Example (Emulsion A) to an acceptable extent (at most 0.017 density points: see Se-compound I). Losses in gradation are reduced to less than 10% for the selenium ripened emulsions, except for those ripened with of the already mentioned Se-compounds VI and VIII.

Losses in maximum density are further lower for the materials the emulsions of which have been ripened with selenium compounds suitable for use in the system according to the present invention.

LIRF-values (values for the low intensity reciprocity failure) are convincingly indicative for the said lower losses in speed and are fully in accordance with screen speeds obtained: a doubling in screen speed is observed for materials having emulsion crystals chemically ripened with selenium compounds for use in the present invention. The said values are indicative for the ability to reach a high speed (a speed or sensitivity of a "400"-system): it is repeated that a reference the screen speed of 0.63 corresponds with the screen speed of a CURIX HTU film (trademarketed product from Agfa-Gevaert NV).

Example 2

This example demonstrates the advantages of emulsions comprising tabular AgCl(I) crystals having {111} major planes having been chemically sensitized with chemically sensitizing compounds comprising selenium.

The following solutions were prepared:

3 l of a dispersion medium (C) containing 0.444 moles of sodium chloride, 15 g of inert gelatin and 270 mg of adenine; temperature was established at 45° C. and pH was adjusted to 5.5;

a 2.94 molar silver nitrate solution (A);

a solution containing 4.476 moles of sodium chloride, 0.0224 moles of potassium iodide and 420 mg of adenin (B1).

A nucleation step was performed by introducing solution A and solution B1 simultaneously in dispersion medium C both at a flow rate of 30 ml/min during 30 seconds. After a physical ripening time of 15 min during which the temperature was raised to 70° C. and 97.5 g of gelatin and 1500 ml of water were added and the mixture was stirred for an additional 5 minutes. Then a growth step was performed by introducing by a double jet during 66 minutes solution A starting at a flow rate of 7.5 ml/min and linearly increasing the flow rate to an end value of 37.5 ml/min, and solution B1 at an increasing flow rate as to maintain a constant mV-value, measured by a silver electrode versus a saturated calomel electrode (S.C.E.), of +92 mV. For this emulsion an iodide content in the silver chloro-iodide tabular crystals of 1.3 mole % was obtained by adding a further amount of 0.8 mole % of iodide at the end of the preparation stage.

To this dispersion medium an amount of 1.25 mmole per mole of silver chloride was added of the dye anhydro-5,5'-dichloro-3,3'-bis(n-sulphobutyl)-9-ethyloxacarbocyanine hydroxide.

After cooling to about 40° C. the pH value of the said dispersing medium was adjusted to a value of 3.0 with sulphuric acid, and after the addition of 55.5 ml of polystyrene sulphonic acid the obtained flocculate was decanted and washed three times with an amount of 6 l of demineralized water in order to remove the soluble salts present. The thus obtained silver chloride tabular emulsion showed following grain characteristics.

The average diameter $d_{EM}$, average thickness "t", average aspect ratio AR were obtained from electron microscopic photographs: the diameter of the grain was defined as the diameter of the circle having an area equal to the projected area of the grain as viewed in the said photographs. Moreover the average sphere equivalent diameter $d_{EM}$ obtained from the measurement of electric reduction currents obtained by reduction of a silver halide grain with a microscopically fine electrode is given: the sphere equivalent diameter was defined as the diameter of a hypothetical spherical grain with the same volume as the corresponding tabular grain. So a value for "$d_{EM}$" of 1.27 μm, a value for "t" of 0.14 μm and of AR of 8.8 was found.

The emulsion was divided in 3 equal parts A, B and C. Before the start of the chemical ripening the mV-value of every emulsion was adjusted at +120 mV with sodium chloride and the pH-value at 5.5 with sodium hydroxide.

Ripening agents causing a different composition of the ripening solutions used were:

for part A: sodium thiosulphate as a source of sulphur;

for part B: tetramethyl selenoureum (see formula III) as a source of selenium replacing sulphur;

for part C: same as for part B but with in addition sodium thiosulphate as a source of sulphur in an amount of half the one used in part A.

Further chemical ripening agents which were the same for the three parts A, B and C were gold thiocyanate and toluene thiosulphonic acid was used as predigestion agent. Amounts of chemical ripening agents were optimized in order to obtain an optimal fog-sensitivity relationship after 2 hours at 57° C.

Before coating each emulsion was stabilized with 1-p-carboxyphenyl-5-mercaptotetrazole and after addition of the normal coating additives the solutions were coated simultaneously together with a protective layer containing 1.3 g gelatin per $m^2$ per side on both sides of a polyethylene terephthalate film support having a thickness of 175 μm. The resulting photographic material contained per side an amount of silver halide corresponding to 4.5 grams of $AgNO_3$ per $m^2$ and an amount of gelatin corresponding to 3.55 g/$m^2$. Samples of these coatings A, B and C were exposed with green light of 540 nm during 0.1 seconds using a continuous wedge.

Processing in the concentrated, hardener-free developer described above which should be diluted with the same amount of demineralized water (pH of developer ready-for-use: 10.46), leads to the following sensitometric results.

The density as a function of the light dose was measured and therefrom were determined the following parameters:

fog level F (with an accuracy of 0.001 density), the relative speed S at a density of 1 above fog (an increase of the said speed with a factor of 2 gives a speed value that is 0.30 lower as the relation is logarithmic and as less light is needed to get the desired density), the contrast expressed as gradation G, calculated between the densities 0.25 and 2.0 above fog, the maximum density DMAX.

Results obtained for fog F, sensitivity S, contrast G and maximum density DMAX with coatings from Emulsion parts A, B and C respectively are summarized in Table 2 hereinafter.

The specifications for a CURIX ORTHO film material, trade name product from Agfa-Gevaert, processed in its own common processing solutions (G138/G343, trademarketed names of developer and fixer from Agfa-Gevaert) in a 90 seconds processing cycle are given as a reference.

TABLE 2

| Emulsion | F | S | G | DMAX |
|---|---|---|---|---|
| A | 0.042 | 1.98 | 2.95 | 3.21 |
| B | 0.066 | 1.57 | 3.50 | 3.47 |
| C | 0.040 | 1.69 | 3.72 | 3.40 |
| CURIX ORTHO | 0.030 | 1.67 | 2.87 | 3.51 |

The most favorable relationship between fog, sensitivity and gradation is obtained with the Emulsion C wherein use is made of a combination of labile sulphur and selenium.

It has thus been demonstrated in this Example that even for short processing times of 45 seconds a suitable sensitometry can be obtained, even with radiographic film materials coated from emulsions having tabular silver chloroiodide {111} crystals as in image-forming system of the present invention.

Having described in detail preferred embodiments of the current invention, it will now be apparent to those skilled in the art that numerous modifications can be made therein without departing from the scope of the invention as defined in the following claims.

We claim:

1. An image-forming system for radiological imaging consisting of an intensifying screen comprising on a support at least one layer of a green-light emitting phosphor and, in operative association therewith, a prehardened light-sensitive photographic silver halide film material, comprising a support and on both sides thereof one or more hydrophilic colloid layers, said layers being hardened to such an extent that their swelling degree is reduced to less than 200% after immersing said material for 2 minutes in demineralized water of 35° C.; comprising in at least one of said hydrophilic layers chemically ripened, monodisperse cubic silver chloroiodide grains having a mean crystal diameter of from 0.40 μm up to 0.65 μm, wherein said grains have been spectrally sensitized for the wavelength range between 520 and 580 nm, have a maximum absorption between 540 and 550 nm and have been coated in a total amount of silver per sq.m. of from 6 g up to 8 g, wherein said amount is expressed as an equivalent amount of silver nitrate per sq.m.; characterized in that in said image-forming system said silver chloroiodide grains have been chemically sensitized with one or more selenide compound(s) generating silver selenide in an emulsion comprising said grains at a temperature of from 45° C. up to 70° C. at an electrical potential difference between a silver electrode and a saturated silver/silver chloride reference electrode of from 100 up to 200 mV.

2. Image-forming system according to claim 1, wherein said selenium compound is a compound selected from the group consisting of substituted selenoureum, substituted triphenylphosphine selenide, and substituted and unsubstituted triphenylorthophosphate selenide.

3. Image-forming system according to claim 1, wherein said spectrally green sensitized monodisperse cubic silver chloroiodide grains have been spectrally sensitized with compounds selected from the group consisting of benzimidazolocarbocyanines, benzoxazolocarbocyanines and a combination thereof.

4. Image-forming system according to claim 1, wherein said chemically ripened monodisperse cubic silver chloroiodide grains have been chemically ripened with one or more sulphur and/or gold compounds.

5. Image-forming system according to claim 4, wherein said sulphur compound is a compound selected from the group consisting of tetramethylthio-dithiocarboxylic acid diamide, dimethylaminodithiomercaptane, thiosulphate and thiosulphonate compounds.

6. Image-forming system according to claim 1, wherein said hydrophilic colloid layers are substantially gelatinous layers having a total gelatin content per side of the support of from 2 $g/m^2$ up to 6 $g/m^2$.

7. Image-forming system according to claim 6, wherein said hydrophilic gelatinous layers are hardened with bis-(vinyl-sulphonyl)-methane or ethylene bis-(vinyl-sulphone).

8. Image-forming system according to claim 1, wherein said green-light emitting phosphor is a gadolinium oxisulphide phosphor.

9. Method of image formation by means of an image-forming system according to claim 1, wherein said image formation comprises the step of processing said film material after exposure with light emitted by a green-light emitting phosphor of an intensifying screen after conversion of X-rays having an energy from 60 to 150 kvp, wherein said step of processing proceeds in an automatic processor.

10. Method according to claim 9, wherein said processing comprises the steps of developing in a developing solution comprising (iso) ascorbic acid, l-ascorbic acid, reductic acid, salts and/or derivatives thereof;

fixing in a fixer solution free from aluminum salts;

rinsing and drying.

11. An image-forming system for radiological imaging consisting of an intensifying screen comprising on a support at least one layer of a green-light emitting phosphor and, in operative association therewith, a prehardened light-sensitive photographic silver halide film material, comprising a support and on both sides thereof one or more hydrophilic colloid layers, said layers being hardened to such an extent that their swelling degree is reduced to less than 200% after immersing said material for 2 minutes in demineralized water of 35° C.; comprising in at least one of said hydrophilic layers chemically ripened {111} tabular silver chloroiodide grains having an aspect ratio of from 5 to 20 and a tabularity from 20 to 200; wherein said grains have been spectrally sensitized for the wavelength range between 520 and 580 nm, have a maximum absorption between 540 and 550 nm and have been coated in a total amount of silver per sq.m. of from 6 g up to 8 g, wherein said amount is expressed as an equivalent amount of silver nitrate per sq.m.; characterized in that in said image-forming system said silver chloroiodide grains have been chemically sensitized with one or more selenide compound(s) generating silver selenide in an emulsion comprising said grains at a temperature of from 45° C. up to 70° C. at an electrical potential difference between a silver electrode and a saturated silver/silver chloride reference electrode of from 100 up to 200 mV.

12. Image-forming system according to claim 11, wherein said selenium compound is a compound selected from the group consisting of substituted selenoureum, substituted triphenylphosphine selenide, and substituted and unsubstituted triphenylorthophosphate selenide.

13. Image-forming system according to claim 11, wherein said spectrally green sensitized tabular grains have been spectrally sensitized with compounds selected from the group consisting of benzimidazolocarbocyanines, benzoxazolocarbocyanines and a combination thereof.

14. Image-forming system according to claim 11, wherein said chemically ripened tabular silver chloroiodide grains have been chemically ripened with one or more sulphur and/or gold compounds.

15. Image-forming system according to claim 14, wherein said sulphur compound is a compound selected from the group consisting of tetramethylthio-dithiocarboxylic acid diamide, dimethylamino-dithiomercaptane, thiosulphate and thiosulphonate compounds.

16. Image-forming system according to claim 11, wherein said hydrophilic colloid layers are substantially gelatinous layers having a total gelatin content per side of the support of from 2 $g/m^2$ up to 6 $g/m^2$.

17. Image-forming system according to claim 16, wherein said hydrophilic gelatinous layers are hardened with bis-(vinyl-sulphonyl)-methane or ethylene bis-(vinyl-sulphone).

18. Image-forming system according to claim 11, wherein said green-light emitting phosphor is a gadolinium oxisulphide phosphor.

19. Method of image formation by means of an image-forming system according to claim 11, wherein said image formation comprises the step of processing said film material after exposure with light emitted by a green-light emitting phosphor of an intensifying screen after conversion of X-rays having an energy from 60 to 150 kVp, wherein said step of processing proceeds in an automatic processor.

20. Method according to claim 19, wherein said processing comprises the steps of developing in a developing solution comprising (iso) ascorbic acid, l-ascorbic acid, reductic acid, salts and/or derivatives thereof;

fixing in a fixer solution free from aluminum salts;

rinsing and drying.

* * * * *